(12) United States Patent
Yamada (10) Patent No.: US 11,970,119 B2
(45) Date of Patent: Apr. 30, 2024

(54) ATTACHMENT DEVICE

(71) Applicant: NIFCO INC., Yokosuka (JP)

(72) Inventor: Tatsumi Yamada, Yokosuka (JP)

(73) Assignee: NIFCO INC., Yokosuka (JP)

( * ) Notice: Subject to any disclaimer, the term of this patent is extended or adjusted under 35 U.S.C. 154(b) by 64 days.

(21) Appl. No.: 17/988,253

(22) Filed: Nov. 16, 2022

(65) Prior Publication Data

US 2023/0173997 A1 Jun. 8, 2023

(30) Foreign Application Priority Data

Dec. 6, 2021 (JP) .................................. 2021-197532

(51) Int. Cl.
*B60R 11/04* (2006.01)
*B60R 11/00* (2006.01)

(52) U.S. Cl.
CPC ....... *B60R 11/04* (2013.01); *B60R 2011/0026* (2013.01); *B60R 2011/0028* (2013.01); *B60R 2011/0075* (2013.01)

(58) Field of Classification Search
CPC ............. B60R 11/04; B60R 2011/0026; B60R 2011/0028; B60R 2011/0075; B60R 11/00; B60R 2011/0063; B60R 2011/0071; B60R 2011/0078
See application file for complete search history.

(56) References Cited

U.S. PATENT DOCUMENTS

| 9,225,884 B2 * | 12/2015 | Blake, III | ............... B60R 11/00 |
| 10,676,040 B2 | 6/2020 | Naoi | |
| 2015/0042798 A1 * | 2/2015 | Takeda | .................... B60R 11/04 348/148 |
| 2016/0229355 A1 * | 8/2016 | Hayashi | ............... G01D 11/245 |
| 2019/0308563 A1 * | 10/2019 | Fujiwara | ................. B60R 11/04 |

FOREIGN PATENT DOCUMENTS

JP 6494750 B2 4/2019

* cited by examiner

*Primary Examiner* — Michael E Teitelbaum
(74) *Attorney, Agent, or Firm* — Manabu Kanesaka (57) ABSTRACT

An attachment device for attaching an electronic device to a vehicle structure includes a base attached to the vehicle structure for supporting the electronic device, and a cover attached to the base by a first engagement portion and a second engagement portion. The first engagement portion includes an engagement concave formed in one of the base and the cover, and an engagement piece formed in the other of the base and the cover and inserting into the engagement concave. The engagement concave includes a first wall and a second wall facing each other in a first direction and opening toward a second direction perpendicular to the first direction. The engagement piece includes a first portion abutting against one of the first wall and the second wall, and a second portion extending from the first portion and abutting against the other of the first wall and the second wall.

8 Claims, 9 Drawing Sheets

ATTACHMENT DEVICE

FIELD OF THE INVENTION

The present invention relates to an attachment device for attaching an electronic device to a vehicle.

BACKGROUND OF THE INVENTION

Patent Document 1 discloses a device attachment structure including a base attached to a window panel and supporting a sensor module, such as a camera, and a cover assembled with the base and covering the base and the sensor module. The base includes an engagement receiving portion provided at a front portion thereof, and an engagement portion provided on a rear portion. The cover includes an engaging piece provided at a front portion thereof, and an engaged portion provided at a rear portion thereof. After the engaging piece is inserted into the engagement receiving portion, the engaged portion is attachably and detachably engaged with the engaging portion, to thereby fix the cover to the base.

Patent Document: Japanese Patent No. 6494750

Problem to be Solved by the Invention

In case a manufacturing error occurs at the base or cover, a space appears between the engagement receiving portion and the engaging portion, so that there arises a problem of rattling of the cover with respect to the base.

In view of the above background, it is an object of the invention to suppress rattling in the device attachment structure.

Further objects and advantages of the invention will be apparent from the following description of the Invention.

SUMMARY OF THE INVENTION

In order to solve the problems, one aspect of the invention is directed to an attachment device for attaching an electronic device (5) to a vehicle structure (2, 3) comprising: a base (6) configured to be attached to the vehicle structure for supporting the electronic device, and a cover (9) attached to the base by a first engagement portion (7) and a second engagement portion (8) for covering the electronic device together with the base. The first engagement portion includes an engagement concave (41) formed in one of the base and the cover, and an engagement piece (42) formed in the other of the base and the cover and inserting into the engagement concave. The engagement concave includes a first wall (41A) and a second wall (41B) facing each other in a first direction and opening toward a second direction perpendicular to the first direction. The engagement piece includes a first portion (42A) abutting against one of the first wall and the second wall, and a second portion (42B) extending from the first portion and abutting against the other of the first wall and the second wall, the second portion having flexibility greater than that of the first portion. A movement of the cover to the second direction relative to the base is restricted by engagement of the cover with the base at the second engagement portion.

In this aspect, the first portion of the engagement piece abuts against one of the first wall and the second wall of the engagement concave, and the second portion of the engagement piece abuts against the other of the first wall and the second wall. Accordingly, the engagement piece is engaged with the engagement concave without rattling. Thus, in the attachment device, rattling is suppressed.

In the above aspect, in a state where the engagement piece is inserted into the engagement concave, the second portion may incline relative to the first direction, and extend to an opening end side of the engagement concave.

In the above aspect, it is possible to avoid tripping of the second portion to an edge of the engagement concave when the engagement piece is inserted into the engagement concave. Also, a damage of the second portion is suppressed.

In the above aspect, the second portion may form a plate spring.

In the aspect, the second portion can more surely abut against the other of the first wall and the second wall.

In the above aspect, the first portion may include a basic member (42E), in a plate shape, having a first face (42C) facing the first wall and a second face (42D) facing the second face, and a through hole (42F) penetrating from the first face to the second face, and the second portion may protrude from a hole wall (42H) defining the through hole.

In the aspect, it is possible to have a large deformation range for the second portion, so that the second portion abuts more surely against the other of the first wall and the second wall.

In the above aspect, the second portion may have a thickness thinner than that of the basic member, and the second portion may be connected to a second face side of the hole wall face, and project outwardly of the through hole beyond the first face.

In the aspect, it is possible to have a large deformation range for the second portion, so that the second portion can abut more surely against the other of the first wall and the second wall.

In the above aspect, the second portion includes a bent portion (42J) bent to a through hole side at a center portion projected from the through hole.

In the aspect, the second portion abuts against, at the bent portion, the other of the first wall and the second wall. Accordingly, the second portion can slide more smoothly to the other of the first wall and the second wall, so that the user can smoothly enter the engagement piece to the engagement concave.

In the above aspect, the first portion may extend along a front edge of the basic portion, and include a thick portion (42G) thicker than the basic portion, and the thick portion may abut against one of the first wall and the second wall.

In the aspect, the rigidity of the engagement piece can improve.

In the above aspect, a part of the hole wall face may be formed by the thick portion, and the second portion may extend from the thick portion.

In the aspect, it is possible to take a large deformation range for the second portion, so that the second portion can more surely abut against the other of the first wall and the second wall.

Advantages of the Invention

In the above structure, rattling can be suppressed in the attachment device.

BRIEF DESCRIPTION OF THE INVENTION

DETAILED DESCRIPTION OF THE INVENTION

Hereinafter, an embodiment of a device attachment structure of the invention is explained. In the device attachment structure, an electronic device is attached to a vehicle structure. The vehicle structure includes a window panel, roof, instrument panel, center console, door and so on. The electronic device includes a various sensor, such as a camera, laser device, lidar, sonar and so on.

The attachment structure is provided at a boundary between the window panel and the roof of the vehicle. The window panel includes a front window panel defining a front part of a vehicle compartment, a rear window panel defining a rear part of the vehicle compartment, and a pair of side window panels.

Figure 1:
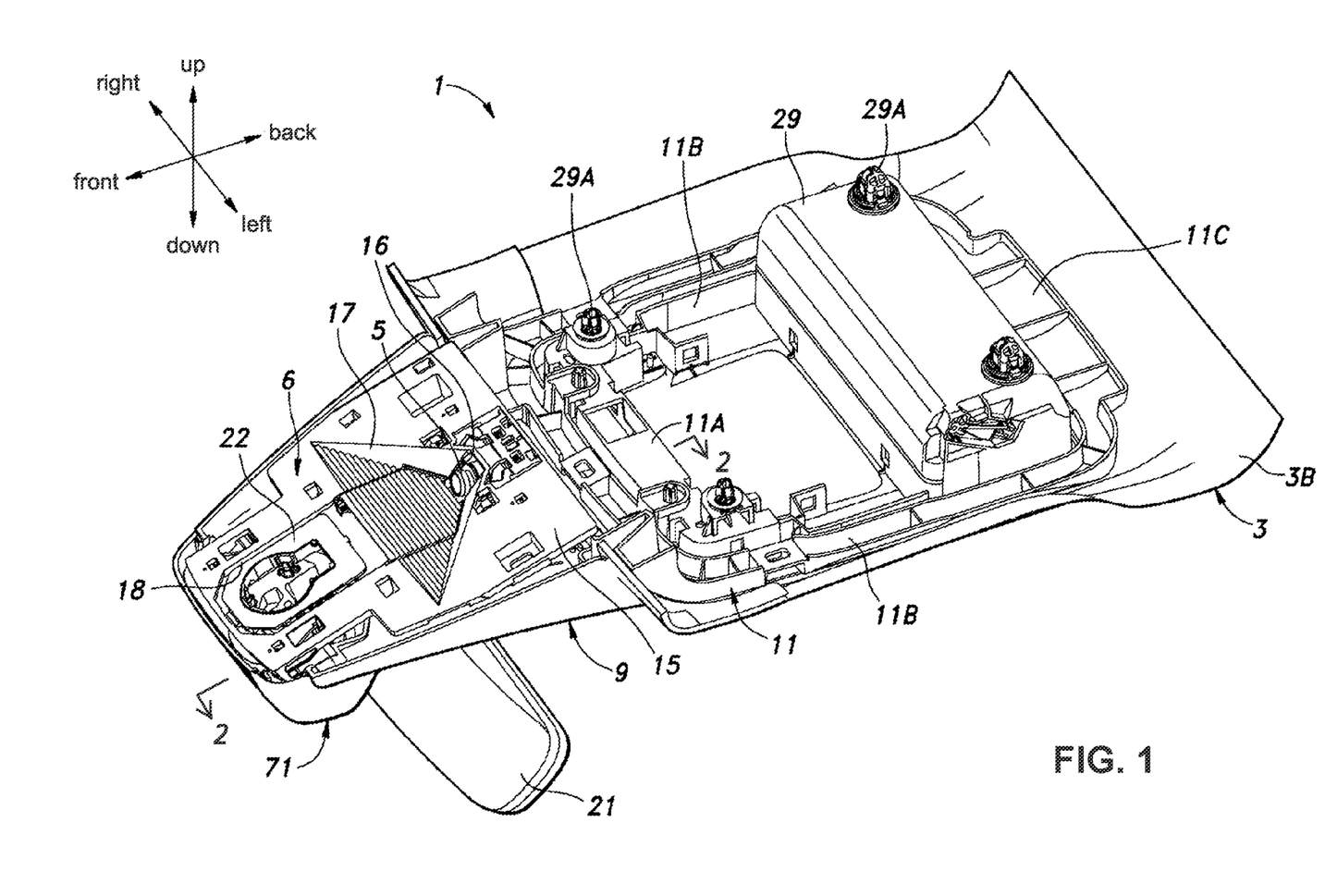
FIG. 1 is a perspective view of an embodiment of an attachment device of the invention.
Figure 2:
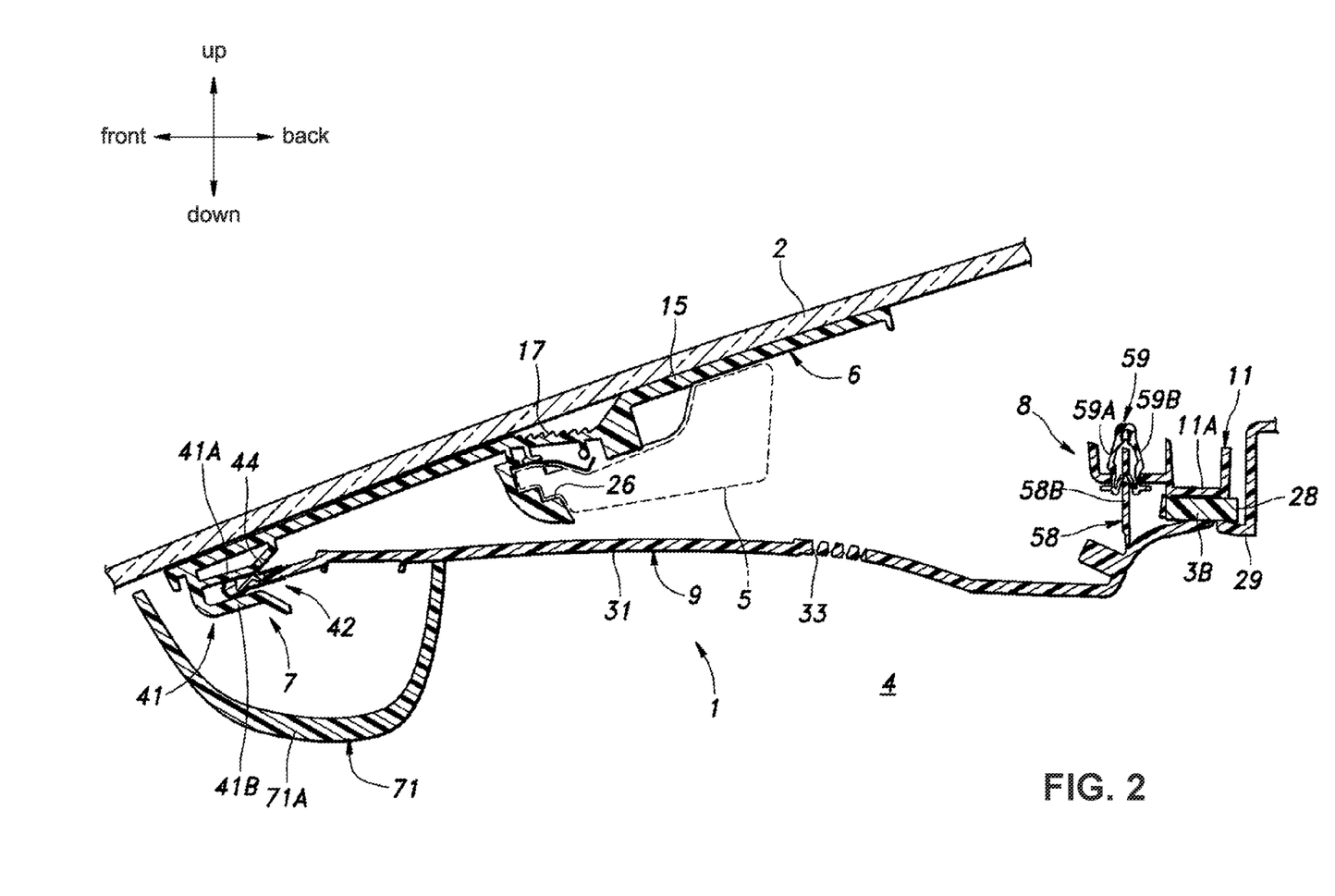
FIG. 2 is an enlarged sectional view taken along line 2-2 in FIG. 1.

As shown in FIGS. 1 and 2, in the present embodiment, the attachment structure 1 is provided at a boundary between the front window panel 2 and the roof 3. The front window panel 2 inclines toward upward. The roof 3 defines an upper portion of a vehicle compartment 4, and is arranged substantially horizontally. The roof 3 includes a roof panel (not shown) made of metal, and a roof lining 3B attached to a lower face of the roof panel. The window panel is preferably made of glass or resin.

The attachment structure 1 is attached to the front window panel 2 as the vehicle attachment structure, and includes a base 6 for supporting the electronic device 5, and a first cover 9 for covering the base 6 and the electronic device 5, which is attached to the base 6 through first engagement portions 7 and second engagement portions 8. The base 6 is attached to an upper end portion in a vehicle inner face (rear face) of the front window panel 2. Also, the attachment structure 1 includes a bracket 11 attached to the roof 3. The first cover 9 is attached, in addition to the base 6, to the bracket 11. The base 6, first cover 9, and bracket 11 are preferably made of resin.

Figure 3:
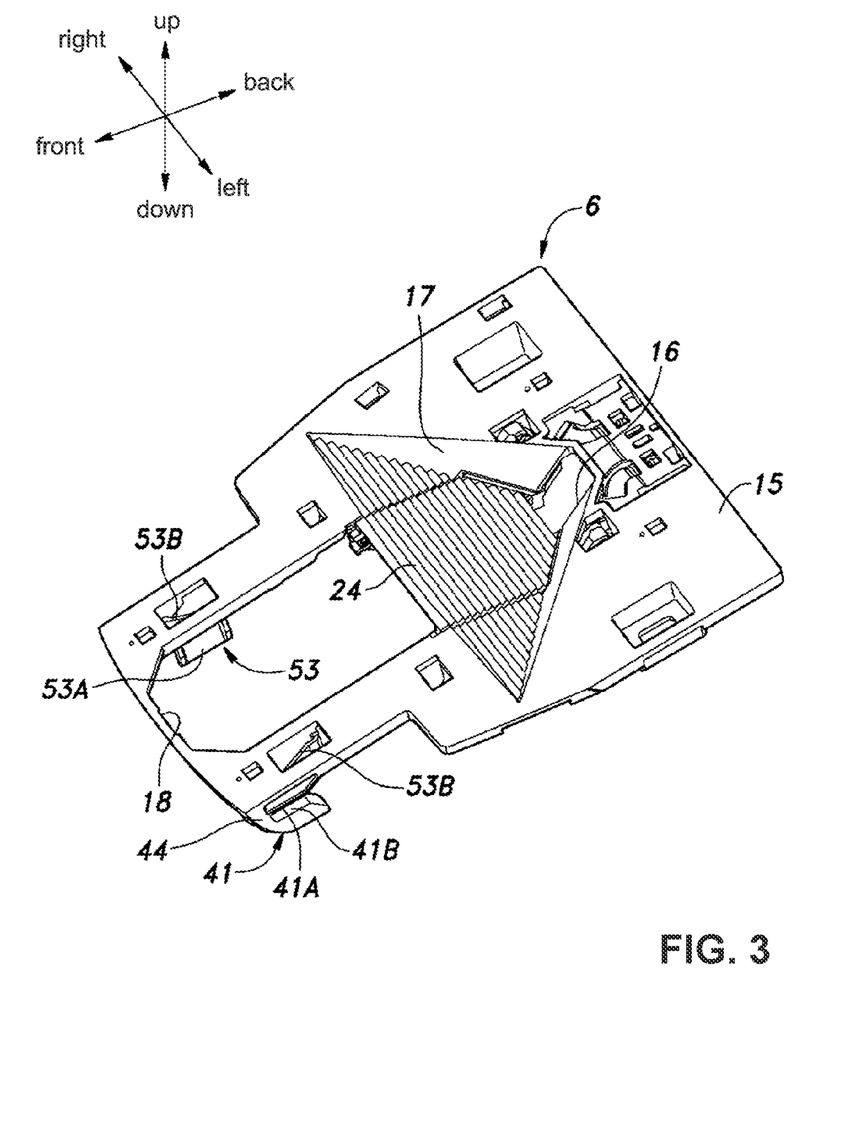
FIG. 3 is a perspective view of a base.

As shown in FIGS. 2 and 3, the base 6 includes a front face and a rear face, and includes a base main portion 15 in the form of a plate shape. The front face of the base main portion 15 is formed in a plain shape. The front face of the base main portion 15 is attached to a vehicle compartment side face of the front window panel 2 by a two face tape or adhesive material. The base main portion 15 extends in the up-down direction along the vehicle compartment side face of the front window panel 2, An upper edge of the base main portion 15 extends left-right, and is arranged near an upper end of the front window panel 2.

A middle in the left-right direction of the upper portion of the base main portion 15 is formed with a through hole 16 penetrating from a front face to a rear face of the base main portion 15. In the front face of the base main portion 15, a front side of the through hole 16 is formed with a light leading groove 17. The light leading groove 17 extends forward from the through hole 16, and the width thereof gradually increases in the left-right direction to the front side. The depth of the light leading groove 17 becomes shallower from the through hole 16 toward forward.

As shown in FIGS. 1 and 3, a center at the left-right direction on the lower side of the base main portion 15 is formed with a mirror attachment hole 18 penetrating from the front face of the base main portion 15 to a rear face thereof. The mirror attachment hole 18 is arranged at a front side of the light leading groove 17. At an inside of the mirror attachment hole 18, a mirror base 22 for supporting a room mirror 21 is arranged. The mirror base 22 is fixed to a vehicle inner face of the front window panel 2 by a two face tape or an adhesive material. The mirror base 22 extends downwardly from the front window panel 2, and then bends to extend rearward. At the rear end of the mirror base 22, the room mirror 21 is provided.

In the base 6, a portion forming the center area in the lift-right direction of the light leading groove 17 may be formed with an additional part 24 which is attachable and detachable. The additional part 24 is preferably formed attachably and detachably to the base 6 by an elastic claw and so on. In a condition where the base 6 is attached to the front window panel 2, the additional part 24 is attachable and detachable relative to the base 6. When the additional part 24 is detached from the base 6, it is possible to clear an inside face of the light leading groove 17 and an inside face of the window panel 2. The additional part 24 may be rotationally attached around a center of a shaft line extending left-right in the front end portion, and engaged to the base 6 attachably and detachably at the rear end thereof.

As shown in FIG. 2, an upper portion of a rear face of the base 6 is provided with a device engagement portion 26 for attachably and detachably engaging the electronic device 5. The device engagement portion 26 is formed with a plurality of elastic claws or an engagement depression 41. In the present embodiment, the device engagement portion 26 includes a pair of left-right engagement grooves 41 for engaging the front end of the electronic device 5, and an elastic claw for engaging the rear end of the electronic device 5. By the device engagement portion 26, the electronic device 5 is attached to the rear face of the base 6. In case the electronic device 5 is a camera, in a condition where the electronic device 5 is attached to the rear face of the base 6, a lens of the camera is arranged at a position facing the through hole 16. In case the electronic device is a raider or lidar, an ejecting portion and a receiving portion may be arranged to correspond to the through hole 16.

Figure 7:
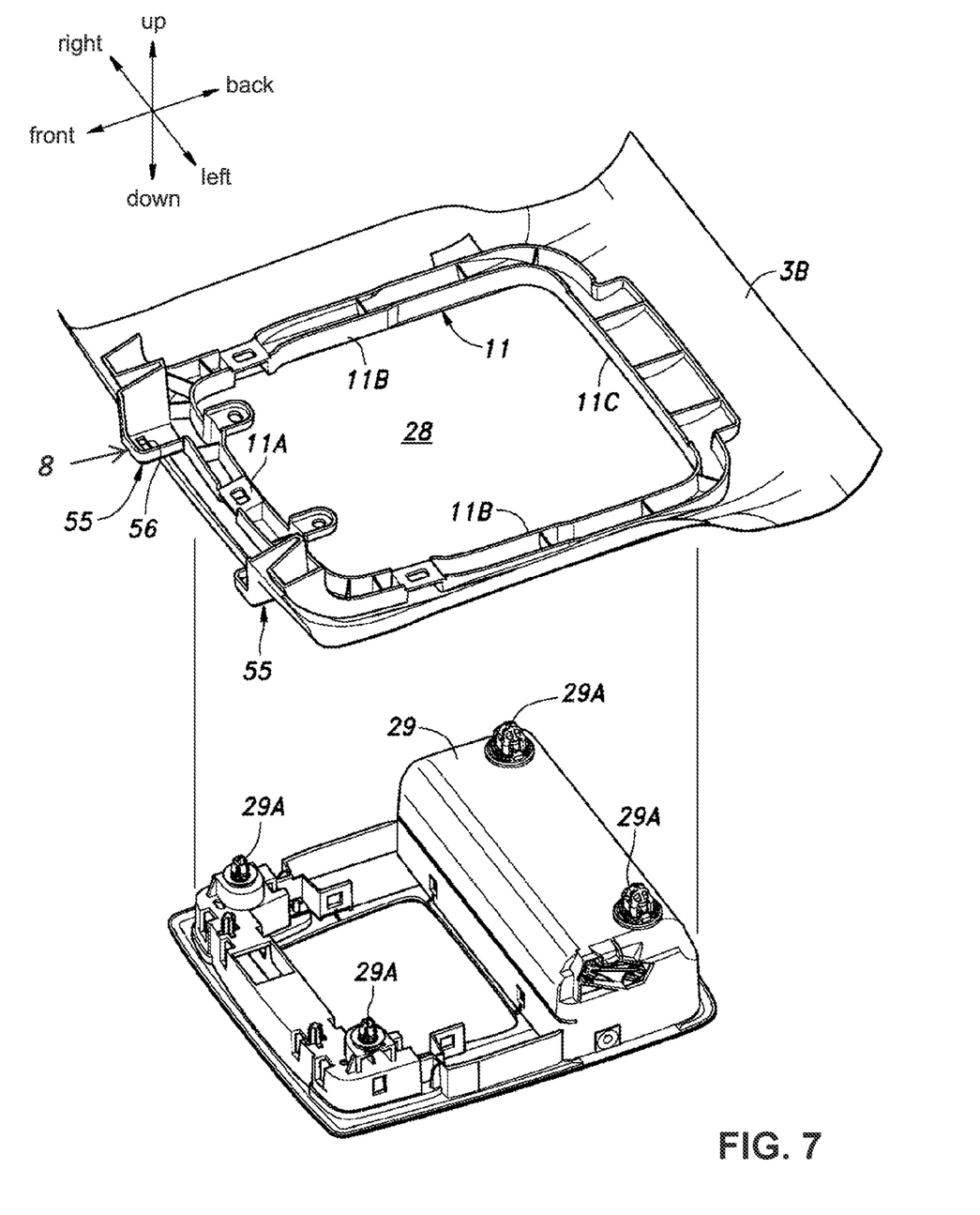
FIG. 7 is an exploded perspective view of a bracket and a roof console.

As shown in FIGS. 1, 2 and 7, the bracket 11 is preferably connected to at least one of the roof panel and the roof lining 3B. In the present embodiment, the bracket 11 is provided at the roof lining 3B. The bracket 11 may be integrally formed with the roof lining 3B. The bracket 11 includes a front edge portion 11A extending left and right, left and right side edge portions 11B extending rearward from left and right edges of the front edge portion 11A, and a rear edge portion 11C extending left and right and respectively attached to the rear ends of the left and right side edge portions 11B, and is formed in frame form in a rectangular shape. The bracket 11 is provided at an edge of an attachment hole 28 penetrating up-down through the roof lining 3B. A roof console 29 is arranged inside the bracket 11. The roof console 28 is preferably connected to the roof panel by connecting members 29A, such as a fastener. The roof console 29 may be an room light or a display and so on.

Figure 4:
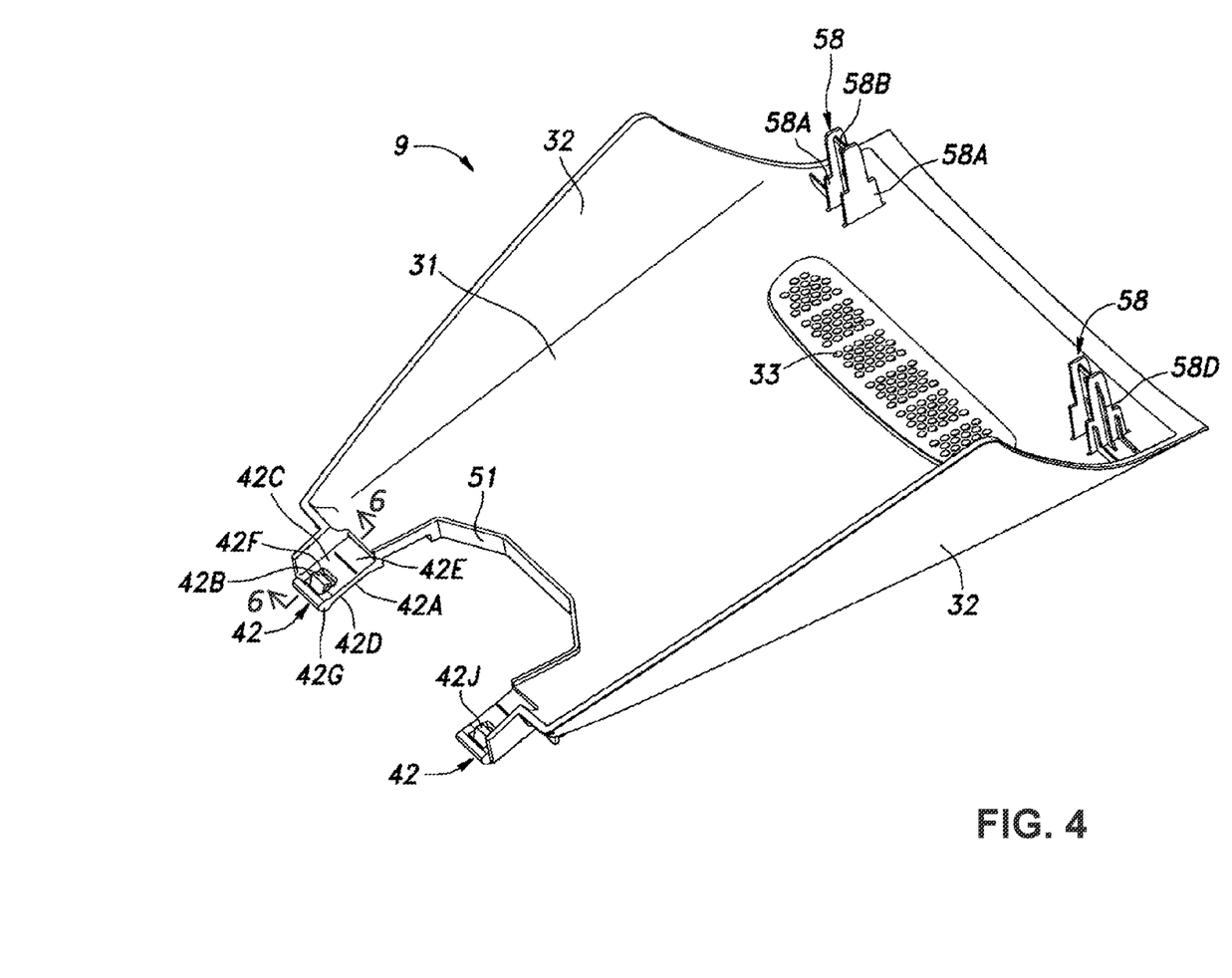
FIG. 4 is a perspective view of a cover seen from above.

As shown in FIGS. 1, 2 and 4, the first cover 9 includes a cover main portion 31 formed in a plate shape, and a pair of left and right cover side wall portions 32 respectively formed at left and right side edges of the cover main portion 31. In a state where the first cover 9 is attached to the base 6 and the bracket 11, the cover main portion 31 extends in a front-rear direction under the base 6. Left and right cover side wall portions 32 extend upwardly from the cover main portion 31. An upper edge of each of the cover side wall portions 32 inclines upwardly toward rearward, and extends along the vehicle inner side face of the front window panel 2. The cover main portion 31 is provided with a plurality of air through holes 33.

As shown in FIG. 2, the first engagement portion 7 includes an engagement concave 41 formed in one of the base 6 and the first cover 9, and an engagement piece 42 formed in the other of the base 6 and the first cover 9 and inserted into the engagement concave 41. In the present embodiment, the base 6 is provided with a pair of left and right engagement concaves 41, and the first cover 9 is provided with the pair of engagement pieces 42.

As shown in FIGS. 2 and 3, at the lower edge of the rear face of the base 6, a pair of left and right support walls 44 projecting rearward is provided. The pair of left and right support walls 44 faces each other in the left-right direction. The pair of left and right concaves 41 is provided in the support walls 44 corresponding to the left and right. The pair of support walls 44 is arranged at left and right of the mirror attachment hole 18 in the lower face of the base 6. Each concave 44 is depressed from a rear edge to forward of each support wall 44, and penetrates in the left-right direction.

The engagement concave 41 includes a first wall 41A and a second wall 41B facing each other in the first direction, and opens in a second direction perpendicular to the first direction. In the present embodiment, the first direction corresponds to the up-down direction, and the second direction corresponds to the front-rear direction. The first wall 41A forms an upper wall of the engagement concave 41, and the second wall 41B forms a lower wall of the engagement concave 41.

The pair of engagement pieces 42 is regulated by the corresponding engagement concaves 41 for the movement in the up-down direction (first direction) and the movement to the front direction in front-rear direction (second direction), but is allowed for the movement in the left-right direction and rear direction.

Figure 5:
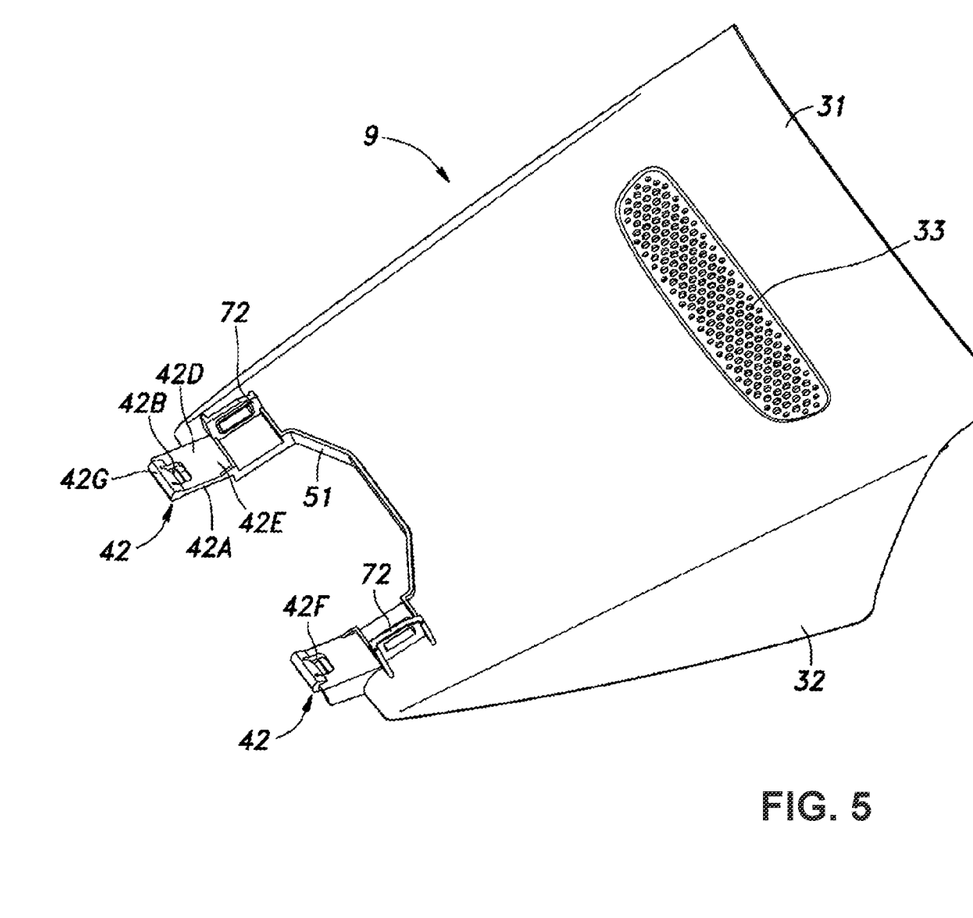
FIG. 5 is a perspective view of the cover seen from below.

As shown in FIGS. 4 and 5, the center in the left-right direction at the front edge of the first cover 9 is formed with a concave 51 depressed rearward. The concave 51 penetrates in the thickness direction of the first cover 9 (up-down direction). The concave 51 is arranged at a lower side of the mirror attachment hole 18. The pair of engagement pieces 42 is provided at the left-right outside the concave 51 in the front edge of the first cover 9.

Each of the engagement pieces 42 includes a first portion 42A abutting against one of the first wall 41A and the second wall 41B, and a second portion 42B projecting from the first portion 42A and abutting against the other of the first wall 41A and the second wall 41B and having a flexibility higher than the first portion 42A. In the present embodiment, the first portion 42A abuts against the second wall 41B, and the second portion 42B abuts against the first wall 41A.

Figure 6:
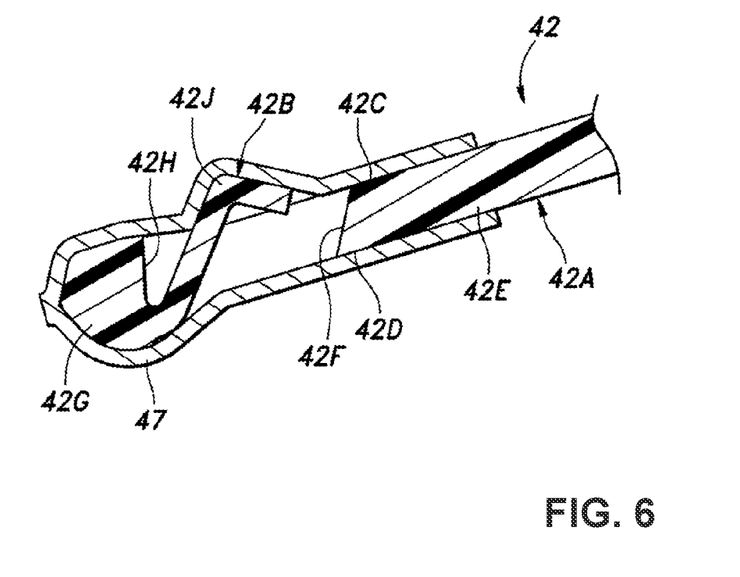
FIG. 6 is an enlarged sectional view of an engagement piece, taken along line 6-6 in FIG. 4.

As shown in FIGS. 4-6, each first portion 42A includes a base 42E in a plate shape having a first face 42C facing the first wall 41A and a second face 42D facing the second wall 41B, and a through hole 42F penetrating through the base 42E from the first face 42C to the second face 42D. Each base 42E extends forward from the front edge of the first cover 9. Also, each first portion 42A extends along the front edge of the base 42E, and has a thick portion 42G thicker than the base 42E. Each thick portion 42G extends in the left-right direction of the base 42E. The thick portion 42G abuts against one of the first wall 41A and the second wall 41B. The thick portion 42G is preferably formed, for example, in a cylindrical columnar shape. Rigidity of the engagement piece 42 is increased by the thick portion 42G.

The second portion 42B projects from a hole wall face 42H defining the through hole 42F. A part of the hole wall face 42H is formed by the thick portion 42G, and the second portion 42B may extend from the thick portion 42G. A connection portion between the second portion 42B and the thick portion 42G is preferably formed with a smooth curve. In the present embodiment, a front portion of the hole wall face 42H is formed by a rear face of the thick portion 42G.

In a state where the engagement piece 42 is inserted into the engagement concave 41, the second portion 42B inclines relative to the front-back direction which is the first direction, and extends to an opening edge side of the engagement concave 41. In the present embodiment, the second portion 42B extends from a front portion of the hole wall portion 42H to a rear and upper direction, and projects upward more than the first face 42C. Accordingly, it is possible to have a large deformation range for the second portion 42B, and the second portion 42B can surely abuts against the first wall 41A. Also, it is possible to avoid the second portion 42B catching an edge of the engagement concave 41. Further, the damage of the second portion 42B can be suppressed.

The thickness of the second portion 42B is thinner than the base 42E. Accordingly, the second portion 42B has a high flexibility than the base 42E. The second portion 42B forms a plate spring. The second portion 42B is connected to the second face 42D side of the hole wall face 42H, and projects outwardly of the through hole 42F beyond the first face 42C. Namely, the connecting portion between the second portion 42B and the hole wall face 42H is offset to the second face 42D side from the center in the thickness direction of the base 42E.

The second portion 42B includes a bent portion 42j bending to the through hole 42F side at the middle portion projecting from the through hole 42F. The second portion 42B is bent perpendicularly in the vent portion 42J. The second portion 42B abuts against the first wall 41A at the bent portion 42J. Accordingly, the second portion 42B can smoothly move relative to the first wall 41A, and a user can smoothly enter the engagement piece 42 to the engagement concave 41.

A rear end of the second portion 42B, seen from above, is arranged at a position overlapping with the through hole 42F. Accordingly, when the second portion 42B is pushed to the base portion 42E side, the rear end of the second portion 42B enters inside the through hole 42F, to thereby avoid interference between the second portion 42B and the base 42E.

When each engagement piece 42 is inserted into the corresponding engagement concave 41, the second portion 42B is pushed by the first wall 41A to elastically deform, and by the restoring force of the second portion 42B, the thick portion 42G of the first portion 42A abuts against the second wall 41B. Accordingly, each engagement piece 42 is engaged with the engagement concave 41 without rattling.

A cushioning material 47 may be provided between each engagement piece 42 and the corresponding engagement concave 41. The cushioning material 47 is preferably formed of, for example a non-woven fabric, urethane sheet and so on. The cushioning material 47 may be adhered on a surface of the engagement piece 42.

As shown in FIG. 3, left and right front urging members 53 are provided inside the left and right sides in the respective support walls 44. Each front side urging member 53 includes a wall 53A projecting downward from a rear side of the base 6, and first elastic pieces 53B extending from a rear edge of the wall 53A to forward and left-right outward directions. Each first elastic piece 53B abuts from the inside of the corresponding engagement pieces 42 in the left and right, and urges the engagement pieces 42 outwardly toward the left and right.

As shown in FIGS. 2 and 7, the second engagement portions 8 engage the rear edge of the first cover 9 to the front edge portion of the bracket 11. The second engagement portions 8 include a pair of left and right support portions 55 in the plate shape projecting from the front edge portion 11A of the bracket 11 forward, and support holes 56 penetrating the support portions 55 in the up-down direction (first direction). Each support hole 56 is formed rectangular extending in the left-right direction.

Figure 8:
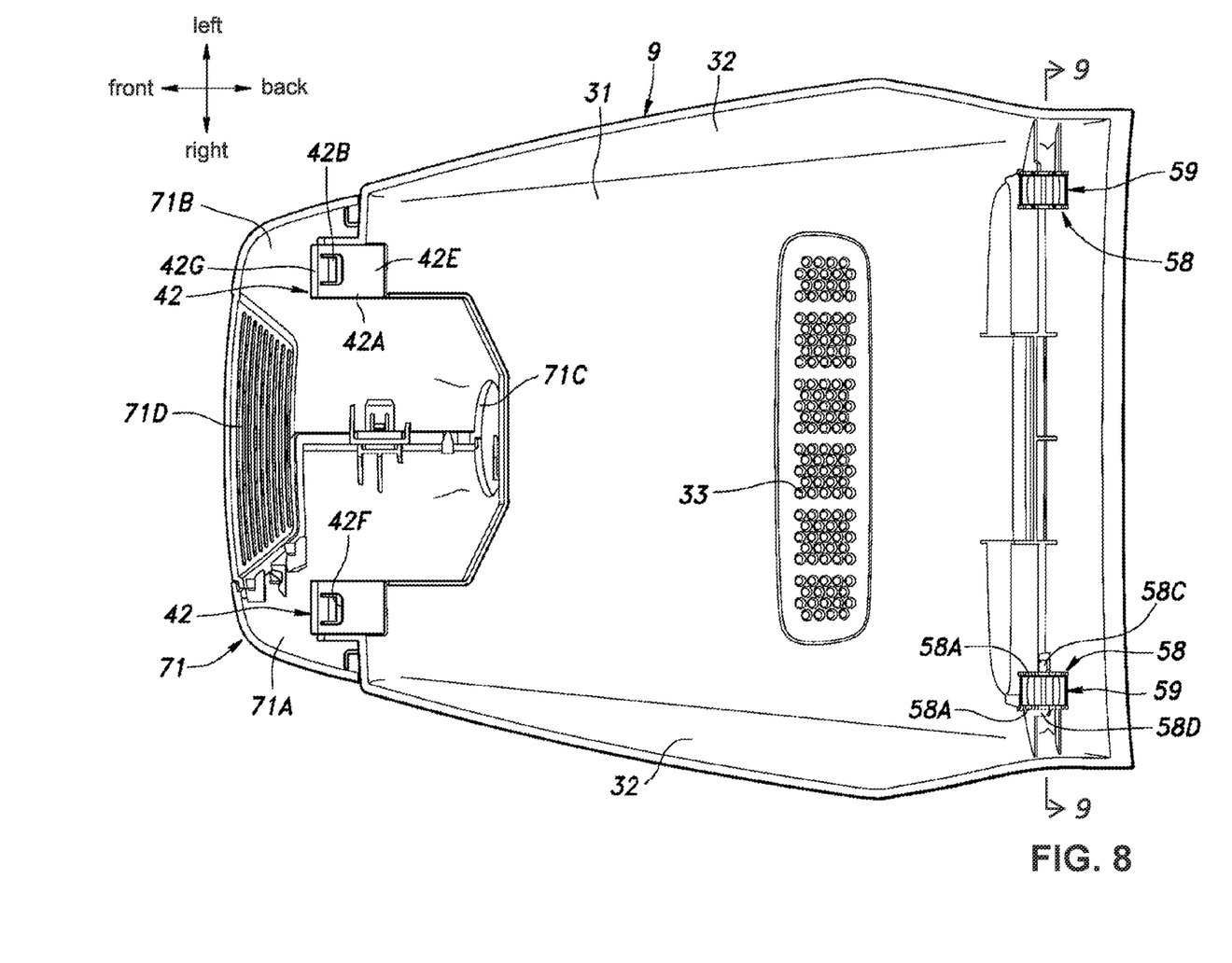
FIG. 8 is a plan view of a first cover and a second cover.
Figure 9:
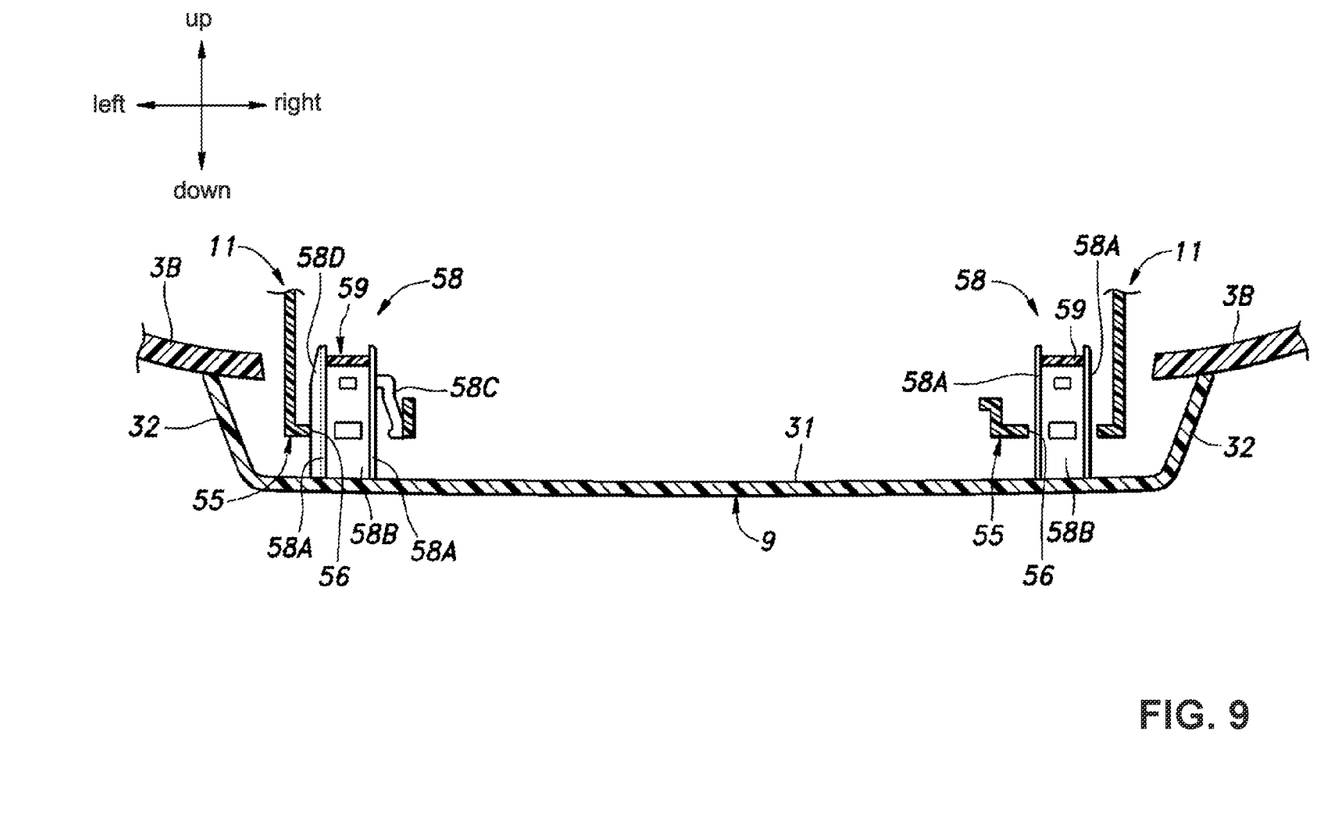
FIG. 9 is a sectional view of the attachment device, taken along line 9-9 in FIG. 8, wherein a first cover is attached to a roof lining.

The rear edge of the first cover 9 is arranged rearward from the upper edge of the base 6, and reward from the front edge 11A of the bracket 11. Namely, the rear end of the first cover 9 is arranged under the front edge 11A of the bracket 11. As shown in FIGS. 2, 4 and 8, the second engagement portions 8 include projection pieces 58 projecting upward from the upper face of the cover main portion 31, and elastic craws 59 attached to the projection pieces 58.

The projection piece 58 includes a pair of left and right side walls 58A, and a connection wall 58B connecting the pair of side walls 58A. Each side wall 58A orients left and right in the faces, and extends in the front-rear direction. The connection wall 58B orients front-rear direction in the face, and extends in the left-right direction. In plane, the projection piece 58 is formed in the H-shape. The elastic piece 59 covers the connection wall 58B from the upper side, and is engaged with the connection wall 58B. The elastic piece 59 preferably includes a front piece 59A extending from the upper edge of the connection wall 58 to the front face side, and a rear piece 59B extending from the upper edge of the connection wall 58B to a rear side. The front piece 59A and the rear piece 59B of the elastic piece 59 are engaged with the connection wall 58B, and the movement in the up-down direction is regulated. The front piece 59A and the rear piece 59B of the elastic piece 59 can move in the front-rear direction relative to the connection wall 58B by elastic deformation. A middle portion of the front piece 59A projects forward from the front edge of the left-right side walls 58A, and the rear piece 59B projects rearward from the rear edge of the left-right side walls 58A.

The pairs of left-right projection pieces 58 and the elastic pieces 59 are inserted into the support holes 56 corresponding thereto in the left and right. The front edges and the rear edges of the pair of side walls 58 abut against the front edges and the rear edges of the support holes 56. Accordingly, the movements of the pair of projection pieces 58 in the front-rear direction are restricted. Also, the respective elastic pieces 59 are engaged with the corresponding support holes 56, so that the movements of the respective projection pieces 58 relative to the support holes 56 in the up-down direction are restricted. The left-right width of each projection piece 58 is formed smaller than the left-right width of the corresponding support hole 56. Accordingly, each projection piece 58 can move in the left-right direction relative to the corresponding support hole 56.

At least one of the pair of projection pieces 58 includes an urging member 58C on one of the pair of side walls 58A, and a rib 58D on the other of the pair of side walls 58A. The urging member 58C extends from the side wall 58A in the left-right side direction, and abuts against the left or right side edge of the support hole 56. The urging member 58C is a spring piece and can elastically deform in the left-right direction. The rib 58D abuts against the support hole 56 by the urging member 58C. Accordingly, one of the projections 58 is fixed to the corresponding support hole 56 in the left-right direction without rattling.

As shown in FIGS. 2 and 8, the second cover 71 is mounted to the front portion of the first cover 9. The second cover 71 includes a left piece 71A and a right piece 71B connecting to each other. The respective left piece 71A and right piece 71B are connected to connecting pieces 72 provided at the front edge on the lower face of the first cover 9. The second cover 71 enlarges downwardly from the front edge of the first cover 9. The second cover 71 covers a depression 51 of the first cover 9 and the front edge of the base 6. At the rear portion of the second cover 71, a through hole 71C for passing the mirror base 22 is formed. At the front portion of the second cover 71, an exhaust hole 71D for receiving air in the vehicle compartment is formed.

Next, an attachment method of the first cover 9 to the base 6 and the bracket 11 is explained. First, a worker inserts the respective engagement pieces 42 of the first cover 9 to the corresponding engagement depressions 41 from rear. At this time, the left-right front urging members 53 push the corresponding engagement pieces 42 outward to the left and right. Accordingly, the first cover 9 is generally arranged in the center relative to the base 6 in the left-right direction.

In a state where the respective engagement pieces 42 are inserted into the respective engagement depressions 41, the respective engagement pieces 42 can rotate in a predetermined range around the thick portion 42G of each engagement piece 42, and the rear edge of the first cover 9 can move in the up-down direction. Next, the worker moves the rear edge of the first cover 9 upward, and inserts the pair of projection pieces 58 to the corresponding support holes 56. Thereby, the respective elastic claws 59 are engaged with the hole edges of the support holes 56. Accordingly, the first cover 9 is attached to the base 6 and the bracket 11. Thereafter, the left piece 71A and the right piece 71B of the second cover 71 are attached to the first cover 9.

In the above embodiment, the first portion 42A of each engagement piece 42 abuts against the second wall 41E of the corresponding engagement depression 41, and the second portion 42B abuts against the first wall 41A. Thereby, the engagement piece 42 engages the engagement depression 41 in the up-down direction without rattling. Namely, in the attachment structure, rattling can be suppressed.

As above, the explanation of the concrete embodiment is finished, but the present invention is not limited to the above embodiment, and can be modified widely. For example, the second portion 42B does not have the bent portion 42J and may extend linearly. Also, in another embodiment, the first portion 42A may abut against the first wall 41A, and the second portion 42B may abut against the second wall 41B.

EXPLANATION OF NUMERALS

1 Attachment structure
2 Front window panel
3 Roof
5 Electronic device
6 Base
7 First engagement portion
8 Second engagement portion
9 First cover 11 Bracket
41 Engagement depression
41A First wall
41B Second wall
42 Engagement piece
42A First portion
42B Second portion
42C First face
42D Second face
42E Base
42F Through hole
42G Thick portion
42H Hole wall face
42J Bent portion The present application is based on and claims priority of Japanese Patent Application No. 2021-197532 filed on Dec. 6, 2021, the entire disclosure of which is incorporated herein.

What is claimed is:

1. An attachment device for attaching an electronic device to a vehicle structure, comprising:
    a base configured to be attached to the vehicle structure for supporting the electronic device, and
    a cover attached to the base by a first engagement portion and a second engagement portion for covering the electronic device together with the base,
    wherein the first engagement portion includes an engagement concave formed in one of the base and the cover, and an engagement piece formed in another of the base and the cover and inserting into the engagement concave,
    the engagement concave includes a first wall and a second wall facing each other in a first direction and opening toward a second direction perpendicular to the first direction,
    the engagement piece includes a first portion abutting against one of the first wall and the second wall, and a second portion extending from the first portion and abutting against another of the first wall and the second wall, the second portion having flexibility greater than that of the first portion, and
    a movement of the cover to the second direction relative to the base is restricted by engagement of the cover with the base at the second engagement portion.

2. The attachment device according to claim 1, wherein in a state where the engagement piece is inserted into the engagement concave, the second portion inclines relative to the first direction, and extends to an opening end side of the engagement concave.

3. The attachment device according to claim 2, wherein the second portion forms a plate spring.

4. The attachment device according to claim 3, wherein the first portion includes a basic member, in a plate shape, having a first face facing the first wall and a second face facing the second face, and a through hole penetrating from the first face to the second face, and
    the second portion protrudes from a hole wall defining the through hole.

5. The attachment device according to claim 4, wherein the second portion has a thickness thinner than that of the basic member, and
    the second portion is connected to a second face side of the hole wall face, and projects outwardly of the through hole beyond the first face.

6. The attachment device according to claim 5, wherein the second portion includes a bent portion bent to a through hole side at a center portion projected from the through hole.

7. The attachment device according to claim 6, wherein the first portion extends along a front edge of the basic portion, and includes a thick portion thicker than the basic portion, and
    the thick portion abuts against one of the first wall and the second wall.

8. The attachment device according to claim 7, wherein a part of the hole wall face is formed by the thick portion, and the second portion extends from the thick portion.

* * * * *